US012545571B2

(12) United States Patent
Helbling et al.

(10) Patent No.: US 12,545,571 B2
(45) Date of Patent: Feb. 10, 2026

(54) OSCILLATING ARMATURE PUMP

(71) Applicant: Sysko AG Systeme & Komponenten, Jona (CH)

(72) Inventors: Norbert Helbling, Jona (CH); Florian Wisskirchen, Weingarten (DE); Michael Wisskirchen, Bad Wurzach (DE); Fred Partzsch, Neukirch (DE)

(73) Assignee: Sysko AG Systeme & Komponenten, Jona (CH)

( * ) Notice: Subject to any disclaimer, the term of this patent is extended or adjusted under 35 U.S.C. 154(b) by 194 days.

(21) Appl. No.: 18/339,543

(22) Filed: Jun. 22, 2023

(65) Prior Publication Data

US 2023/0416072 A1 Dec. 28, 2023

(30) Foreign Application Priority Data

Jun. 28, 2022 (DE) ......................... 102022116097.1

(51) Int. Cl.
*B67D 1/10* (2006.01)
*F04B 49/16* (2006.01)
(Continued)

(52) U.S. Cl.
CPC .............. *B67D 1/102* (2013.01); *F04B 49/16* (2013.01); *F04B 53/14* (2013.01); *F04B 53/162* (2013.01)

(58) Field of Classification Search
CPC .......... B67D 1/102; F04B 49/16; F04B 53/14; F04B 53/162; F04B 17/046;
(Continued)

(56) References Cited

U.S. PATENT DOCUMENTS 1,632,262 A * 6/1927 Aikman .................. F04B 39/06 417/469
6,554,588 B1 4/2003 DiBenedetto
(Continued)

FOREIGN PATENT DOCUMENTS

DE 202005006584 U1 8/2005
DE 60016905 T2 12/2005
(Continued)

OTHER PUBLICATIONS

Search Report for German Patent Application No. 10 2022 116 097.1, mailed Jun. 28, 2023, 9 pages.
European Search Report received in related European Application No. 23180714.0, mailed Jan. 15, 2024, 17 pages.

*Primary Examiner* — Donnell A Long
(74) *Attorney, Agent, or Firm* — Womble Bond Dickinson (US) LLP

(57) ABSTRACT

The invention is based on an oscillating armature pump, in particular for a beverage machine, for conveying a liquid, having
- a pressure cylinder,
- a working cylinder,
- a working piston that has a piston part that is configured to be guided in the pressure cylinder and to delimit a pressure chamber together with the pressure cylinder, and that has a magnet element that is configured to be guided in the working cylinder, the working piston being configured to be set in stroke motion, in particular oscillating stroke motion, along a working axis in order to enlarge and/or reduce a volume of the pressure chamber.

Figure 1:
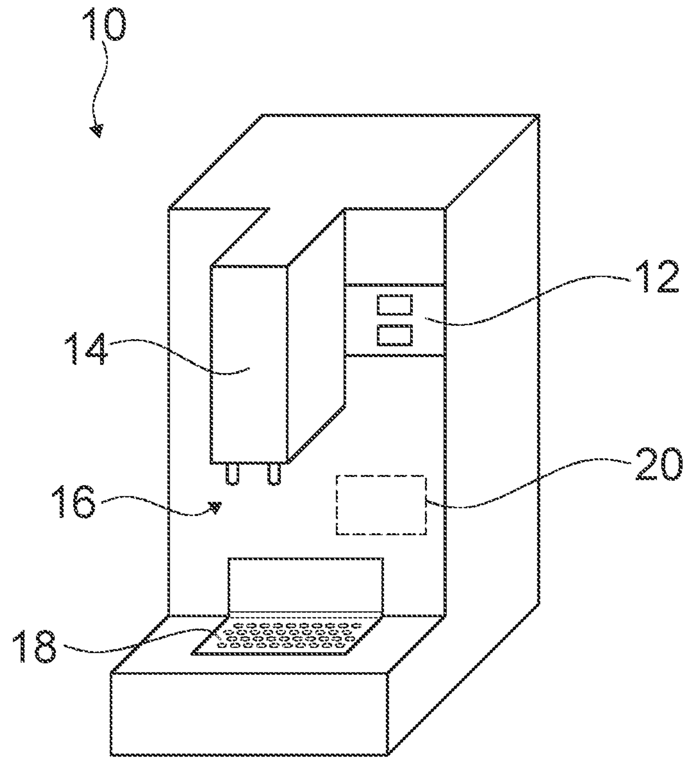

It is proposed that the working piston has at least one first connection point that is configured to connect the piston part and the magnet element to one another, in particular directly,
(Continued)

and to transmit forces having any direction from the magnet element to the piston part along the working axis.

16 Claims, 4 Drawing Sheets

(51) Int. Cl.
*F04B 53/14* (2006.01)
*F04B 53/16* (2006.01)

(58) Field of Classification Search
CPC ...... F04B 39/0005; F04B 39/14; F04B 17/04; F04B 9/06; F04B 53/10; F04B 53/12
See application file for complete search history.

(56) References Cited

U.S. PATENT DOCUMENTS

| | | | |
|---|---|---|---|
| 2005/0025638 | A1 | 2/2005 | Buffet |
| 2012/0230847 | A1 | 9/2012 | Lonski |

FOREIGN PATENT DOCUMENTS

| | | | | | |
|---|---|---|---|---|---|
| DE | 102005048765 | A1 | | 4/2007 | |
| DE | 102010044775 | A1 | | 3/2011 | |
| DE | 102013107481 | A1 | | 1/2015 | |
| EP | 0288216 | A1 | | 10/1988 | |
| EP | 0288216 | B1 | | 4/1992 | |
| EP | 1365149 | A2 | * | 11/2003 | ............ F04B 17/046 |
| EP | 3279473 | A1 | | 2/2018 | |

* cited by examiner

OSCILLATING ARMATURE PUMP

CROSS REFERENCE TO RELATED APPLICATION

This application is based on and incorporated herein by reference the German patent application DE 10 2022 116 087.1, which was filed on Jun. 28, 2022.

PRIOR ART

The invention relates to an oscillating armature pump, a beverage machine, a piston part, and a working piston.

In particular DE 10 2010 044 775 A1 has already proposed an oscillating armature pump that has a two-part working piston consisting of a piston part and a magnet element that are separate from one another and are pressed against one another only by spring force.

The object of the invention consists in particular in providing a device of the type in question having improved properties with regard to greater stability, a reduction in the number of components, and/or improved user-friendliness. The object is achieved according to the invention.

ADVANTAGES OF THE INVENTION

The invention proceeds from an oscillating armature pump, in particular for a beverage machine, for conveying a liquid, having a pressure cylinder, a working cylinder and a working piston. The working piston has a piston part that is configured to be guided in the pressure cylinder and to delimit a pressure chamber together with the pressure cylinder. The working piston also has a magnet element that is configured to be guided in the working cylinder. The working piston is configured to be set in stroke motion, in particular oscillating stroke motion, along a working axis in order to enlarge and/or reduce a volume of the pressure chamber.

It is proposed for the working piston to have at least one first connection point that is configured to connect the piston part and the magnet element to one another, in particular directly, and to transmit forces having any direction from the magnet element to the piston part along the working axis. By connecting the components, a greater stability and an improved force transmission can be achieved. Furthermore, an impact between the piston part and the magnet element can be avoided, which can lead to reduced noise emission. A lower number of components or a material saving can likewise be achieved thereby. In particular, a number of springs needed to move the working piston into an idle position can be reduced, or springs can be made shorter, if these are only intended to avoid an impact of the working piston at the cylinder end.

The beverage machine is configured in particular to conduct at least one beverage freely out of a beverage outlet, wherein it is in particular intended for the beverage to be poured into an open beverage container, in particular an item of crockery such as a glass, a cup, a pot or a mug, or alternatively collected in a collection tray of the beverage machine. In particular, the liquid is a liquid needed for beverage preparation, in particular water, alternatively hot water. Alternatively, the liquid can be a fully prepared beverage. In particular, the beverage machine can be configured to convey different liquids, in particular depending on an operating program, by means of the oscillating armature pump, wherein in particular at least one of said liquids is a flushing liquid.

The pressure chamber and/or the pressure cylinder in particular have at least one outlet that is configured to allow liquid pressurized in the pressure cylinder by the action of the piston part to escape. Preferably, the outlet is arranged on a side, preferably an end face, alternatively a lateral face, of the pressure cylinder that is preferably opposite a side through which the piston part is introduced. The pressure cylinder in particular has a shape similar to a circular cylinder. Alternatively, it is conceivable for the pressure cylinder to have a conically tapering shape, wherein in particular the inner diameter of the pressure cylinder decreases starting from a side through which the piston part is introduced. In particular, the inner diameter of one end of the pressure cylinder differs from the other end of the pressure cylinder by at most 0.01 mm, in particular at most 0.03 mm, preferably at most 0.1 mm.

For example, the piston part and the magnet element are manufactured from different materials. Alternatively, it is possible for the piston part and the magnet element to be manufactured from the same material.

For example, the piston part is formed from a material that is chemically at least substantially inert to water, in particular stainless steel or plastic.

Preferably, the magnet element is formed at least partially, in particular at least 50%, for example at least 80%, preferably at least 90%, in particular completely from a magnetic or magnetizable material. Alternatively, the magnet element could have at least one, in particular non-magnetic, carrier body to which at least one permanent magnet is fastened and/or in which at least one permanent magnet is encapsulated. In particular, the magnet element has permanent magnetization. Alternatively, it is conceivable for the magnet element to be formed from a ferromagnetic or paramagnetic material. For example, the magnet element is designed as a turned part, that is, in particular manufactured at least partially by means of a turning method and/or a CNC method.

Preferably, the oscillating armature pump has at least one coil unit that is configured, at least in a state when current flows through a coil of the coil unit, to deflect the magnet element and thus in particular the working piston out of an idle position by acting magnetically on the magnet element and thus to set same in stroke motion. In particular, the oscillating armature pump has a spring unit, with in particular at least one spiral spring that is configured to exert a force, acting toward the idle position, on the working piston when said working piston is deflected out of the idle position. In particular, the spring unit has at least one compression spring that is arranged on an end side of the working cylinder. In particular, the spring unit has two compression springs that are each arranged on one of the opposing end faces of the working cylinder. Alternatively or additionally, it is conceivable for the spring unit to have at least one tension spring, or for the spring unit to have at least one spring that is configured to act as a tension spring or as a compression spring depending on a state of the oscillating armature pump, in particular depending on the position of the working piston.

The working axis preferably lies parallel to a central axis of the working cylinder and/or a central axis of the pressure cylinder and/or corresponds to one or advantageously both of these central axes.

The connection point is preferably configured for a force-fitting or a form-fitting connection, in particular by crimping and/or riveting. Alternatively, the connection point can be configured for an integral bond, in particular in the form of a welded, soldered or adhesive connection.

"Configured" is intended in particular to mean specifically programmed, designed and/or equipped. Where an object is configured for a particular function, this is intended to mean in particular that the object fulfills and/or carries out this particular function in at least one use state and/or operating state.

Furthermore, it is proposed for the piston part to be a deep-drawn part that is manufactured by means of a deep-drawing method. In particular simple production can be achieved thereby. In particular, smaller wall thicknesses and thus larger inner diameters, alternatively smaller outer diameters, and/or a lower weight can be achieved than by a piston part produced by means of a turning method.

According to a further inventive concept, an oscillating armature pump, in particular for a beverage machine, for conveying a liquid is proposed, having a pressure cylinder, a working cylinder, and a working piston that has a piston part that is configured to be guided in the pressure cylinder and to delimit a pressure chamber together with the pressure cylinder, and that has a magnet element that is configured to be guided in the working cylinder, wherein the working piston is configured to be set in stroke motion, in particular oscillating stroke motion, along a working axis in order to enlarge and/or reduce a volume of the pressure chamber, wherein the piston part is a deep-drawn part that is manufactured by means of a deep-drawing method.

Previously described developments are also intended to apply to this inventive concept. The further variants relate to all the previously described inventive concepts.

Furthermore, it is proposed for the piston part to be at least substantially cylindrical and to have a diameter, in particular an outer diameter, of less than 6 mm, in particular less than 5 mm, for example less than 4.5 mm. As a result, in particular higher pressures can be reached in the pressure chamber, and/or a situation can be achieved in which a lower force acts on the working piston, in particular the magnet element, in order to achieve the same pressure. A reduced volume in the pressure cylinder can in particular be compensated for by an extended stroke travel or by a higher number of stroke cycles.

According to a further embodiment, it is proposed for the piston part to have an outer diameter that increases starting from an end that lies in the pressure chamber in the installed state. In particular, the piston part is at least partially conical. In particular, the smallest outer diameter and the largest outer diameter of the piston part differ, in particular at least in the portion that is configured for introduction into the pressure cylinder, by at most 0.1 mm, in particular by at most 0.03 mm, preferably by at most 0.01 mm. In particular, the smallest outer diameter and the largest outer diameter of the piston part differ, in particular at least in the portion that is configured for introduction into the pressure cylinder, by at least 0.01 mm, in particular by at least 0.02 mm, preferably by at least 0.05 mm. In particular, a material saving and/or a higher pressure in the pressure cylinder can be achieved.

Furthermore, it is proposed for the piston part to be at least substantially hollow cylindrical and to have a wall thickness of less than 0.5 mm, in particular less than 0.4 mm, advantageously less than 0.3 mm. In particular, a material saving can be achieved thereby.

The oscillating armature pump can also have at least one rod seal that is configured to seal the pressure chamber and/or the pressure cylinder with respect to the piston part. In particular, the rod seal is configured to surround the piston part in a ring in an operation-ready state. In particular, the rod seal is arranged and/or anchored in a groove and/or channel in a wall of the pressure cylinder. Alternatively, it is conceivable for the rod seal to be arranged and/or anchored on the piston part. The rod seal allows sealing with respect to changing outer diameters of the piston part and/or inner diameters of the pressure cylinder, in particular in comparison with a ring seal.

According to a further embodiment, the working piston can have at least one compensation piece that is arranged between the magnet element and the piston part and has an compensation opening that is configured to fluidically interconnect a first working chamber and a second working chamber, which are separated from one another by the magnet element, in the working cylinder, in particular in such a way that the liquid flows through the magnet element when the working piston moves. In particular, reliable operation of the pump can be achieved thereby. In particular, the magnet element has at least one longitudinal cut-out, in particular longitudinal bore, that is configured to fluidically interconnect end-face ends of the magnet element.

Preferably, the compensation piece is formed integrally with the piston part, as a result of which in particular a low number of components can be achieved. In particular, the piston part and the compensation piece are manufactured from a single piece.

Alternatively it is conceivable for the compensation piece to be designed as part of the magnet element. Furthermore, the compensation piece can be manufactured independently of the magnet element and the piston part and connect the magnet element and the piston part to one another by means of the connection point and a further connection point.

It is also proposed for the working piston to have at least one inlet valve that is arranged in a cavity in the piston part and is configured to regulate a passage of the liquid out of the working cylinder into the pressure cylinder. In particular, a space-saving design can be achieved thereby.

According to alternative embodiments, the pressure cylinder can have an inlet valve, in particular on a lateral face, wherein the piston part is preferably leak-tight with respect to the pressure chamber.

According to a preferred embodiment, it is proposed for the inlet valve to have a valve spring with a conical shape, preferably in the form of a spiral spring. In particular, the valve spring is designed as a compression spring that is configured to pull a sealing body into a sealing seat molded on the piston part. In particular, low noise emissions can be achieved thereby. Alternatively, the valve spring can be designed as a tension spring and/or have a cylindrical shape.

Furthermore, a coffee machine, in particular a capsule coffee machine, also referred to as an automatic coffee maker, that has a previously described oscillating armature pump is proposed.

A working piston and a piston part for a previously described oscillating armature pump are also proposed.

DRAWINGS

Further advantages can be found in the description of the drawings below. The drawings show an exemplary embodiment of the invention. The drawings, the description and the claims contain numerous features in combination. A person skilled in the art will expediently also consider the features individually and combine them to form further practical combinations.

Figure 2:
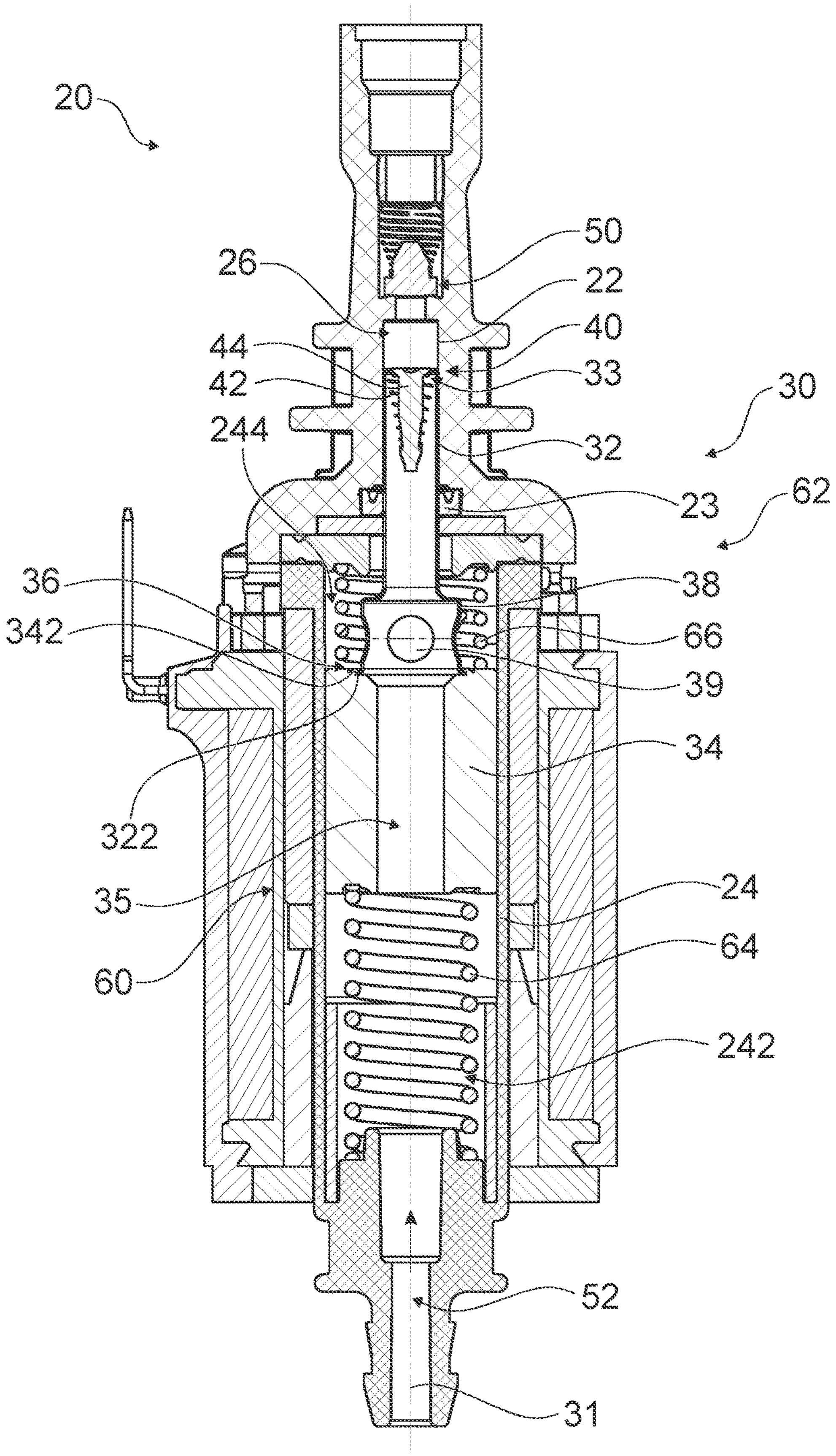
Figure 3:
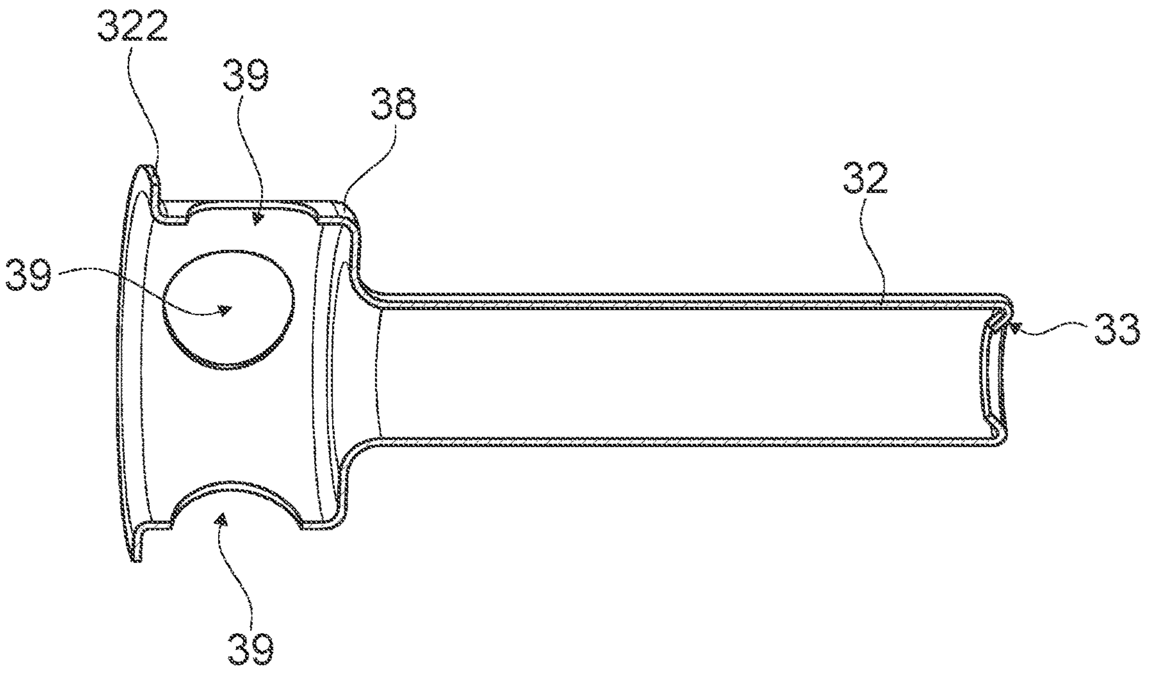
Figure 4:
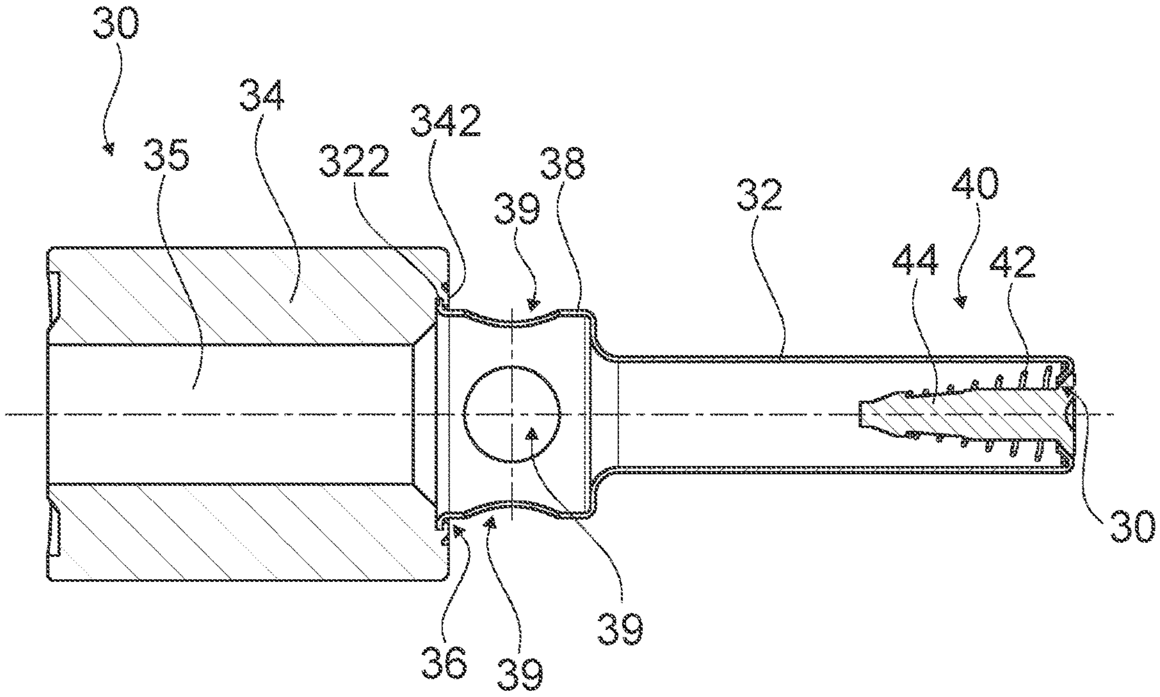
Figure 5:
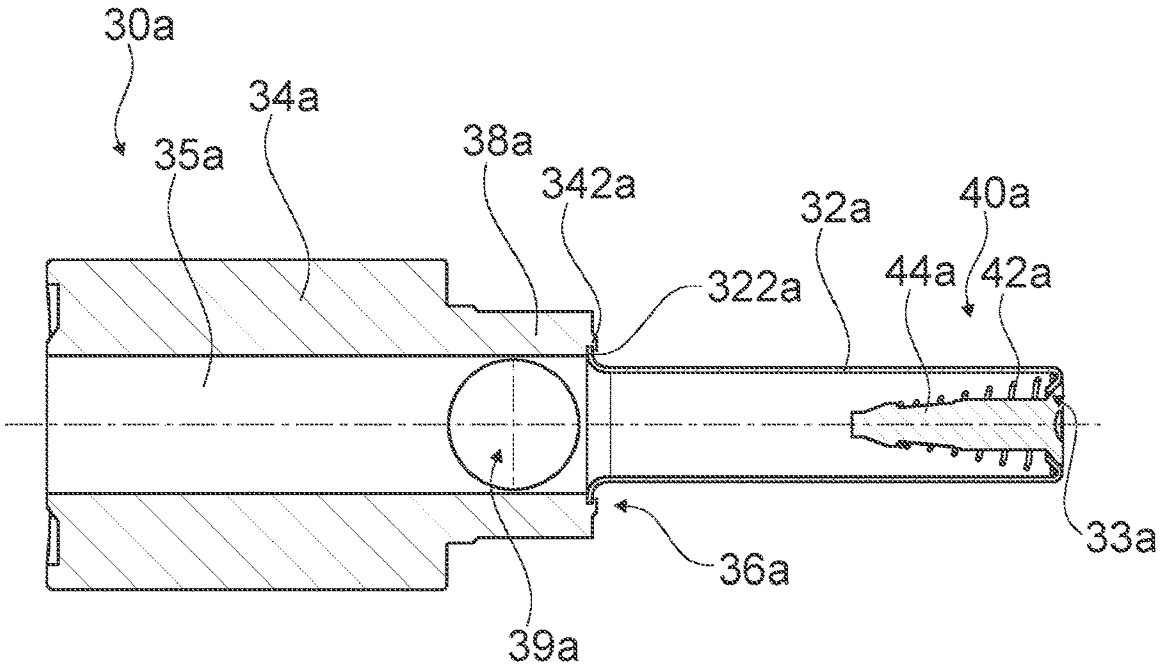
Figure 6:
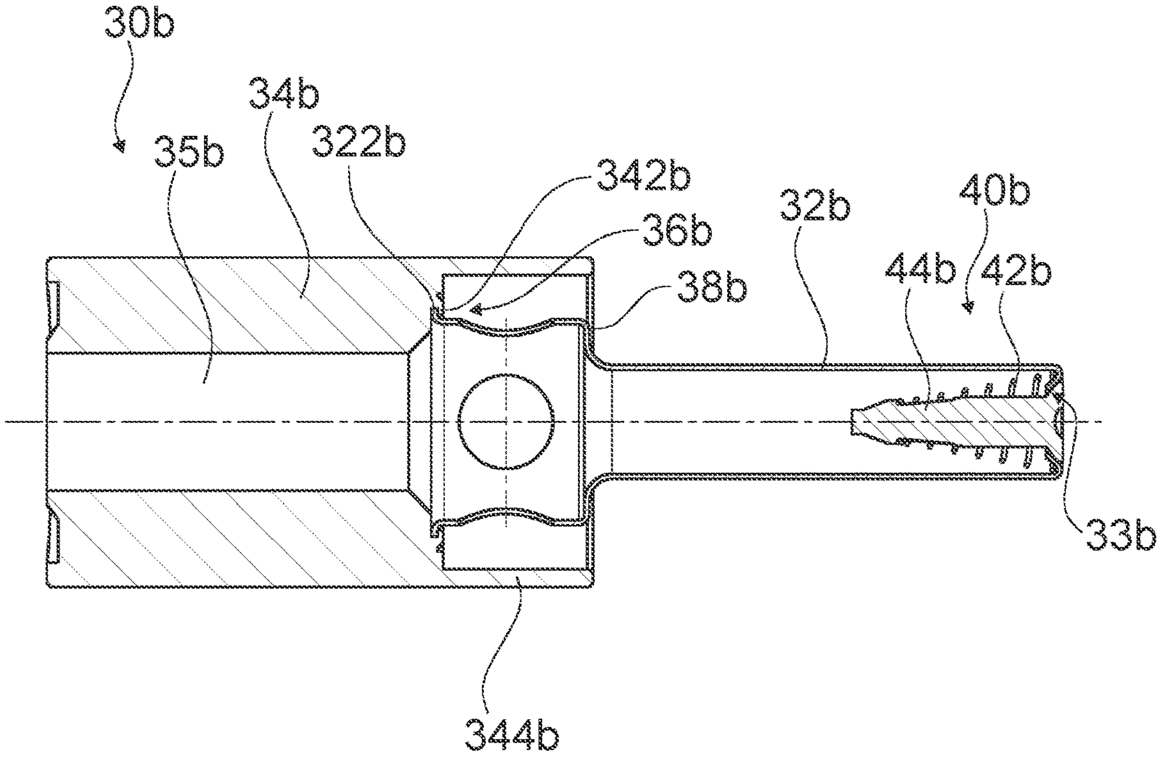

In the figures,

FIG. 1 shows a schematic diagram of a beverage machine according to the invention, FIG. 2 shows a schematic sectional diagram of an oscillating armature pump according to the invention with a working piston according to the invention, FIG. 3 shows a perspective sectional diagram of a piston part according to the invention, FIG. 4 shows a schematic sectional diagram of the working piston of FIG. 2, FIG. 5 shows a schematic sectional diagram of a working piston according to the invention, and FIG. 6 shows a schematic sectional diagram of a working piston according to the invention.

DESCRIPTION OF THE EXEMPLARY EMBODIMENTS

FIG. 1 shows a beverage machine 10. The beverage machine 10 is in the form of a coffee machine. The beverage machine 10 is in the form of a capsule coffee machine. The beverage machine 10 has an operating unit 12. The beverage machine 10 also has a dispensing unit 14 by means of which a beverage can be dispensed. The beverage machine 10 has an installation area 18. The installation area 18 is in particular in the form of a screen in order to collect overflowing beverage, for example. Between the installation area 18 and the dispensing unit 14 there is a depositing space 16, for example for a beverage container, in particular a cup or mug.

The beverage machine 10 also has an oscillating armature pump 20. The oscillating armature pump 20 is configured to convey a liquid. The oscillating armature pump 20 is configured to press heated water under pressure into a coffee portion capsule.

The oscillating armature pump 20 has a pressure cylinder 22 (cf. FIG. 2). The oscillating armature pump 20 also has a working cylinder 24. The pressure cylinder 22 has a smaller inner diameter than the working cylinder 24. The inner diameter of the working cylinder 24 is three to five times as large as the inner diameter of the pressure cylinder 22. The oscillating armature pump 20 also has a working piston 30 (cf. also FIG. 4). The working piston 30 has a piston part 32 that is guided in the pressure cylinder 22 and delimits a pressure chamber 26 together with the pressure cylinder 22. The working piston 30 also has a magnet element 34 that is guided in the working cylinder 24. The working piston 30 is configured to be set in stroke motion, in particular oscillating stroke motion, along a working axis 31 in order to alternately enlarge and reduce a volume of the pressure chamber 26.

The working piston 30 has at least one first connection point 36 that is configured to connect the piston part 32 and the magnet element 34 to one another, in particular directly, and to transmit forces having any direction from the magnet element 34 to the piston part 32 along the working axis 31.

The piston part 32 is a deep-drawn part that is manufactured by means of a deep-drawing method (cf. FIG. 3). The magnet element 34 is in the form of a turned part. The magnet element 34 has a crimping collar 342. The connection point 36 has a lip 322. The connection point 36 is achieved by deforming the crimping collar 342. The connection point 36 has a form-fitting connection between the piston part 32 and the magnet element 34. After deformation, the crimping collar 342 together with the magnet element 34 forms a channel that encloses the lip 322 of the piston part 32.

Alternatively, the piston part can be fastened to the magnet element 34 by means of a simple press fit. According to a further alternative, the piston part can have a lip while the magnet element is flat and wherein the lip is configured to be soldered or welded to the magnet element.

The piston part 32 is formed at least substantially cylindrical and has an outer diameter between 5.6 mm and 4.2 mm.

The piston part 32 has, in particular as a result of its production as a deep-drawn part, an outer diameter that increases starting from the pressure chamber 26.

The piston part 32 is formed at least substantially hollow-cylindrical and has a wall thickness of 0.25 mm.

The oscillating armature pump 20 also has a rod seal 23 that is configured to seal the pressure chamber 26 with respect to the piston part 32.

The working piston 30 has an compensation piece 38 that is arranged between the magnet element 34 and the piston part 32. The compensation piece 38 has an compensation opening 39 that is configured to fluidically interconnect a first working chamber 242 and a second working chamber 244, which are spatially separated from one another by the working piston 30, in particular by the magnet element 34, in the working cylinder 24. The liquid can flow through the magnet element 34 when the working piston 30 moves. The magnet element 34 is cylindrical, in particular hollow cylindrical. The magnet element 34 has a pass-through opening 35, in particular a central bore. For example, the pass-through opening 35 extends from a side of the magnet element 34 facing the first working chamber 242 to a side of the magnet element 34 facing the second working chamber 244. The compensation opening 39 is in particular designed as a transverse bore, in particular transverse to the working axis 31. For example, the compensation piece 38 has at least four compensation openings 39, that is, in particular two intersecting transverse bores. The first working chamber 242 is situated on a side of the magnet element 34 facing away from the pressure cylinder 22. The second working chamber 244 is situated on a side of the magnet element 34 facing away from the pressure cylinder 22.

The compensation piece 38 has a hollow cylindrical shape. The compensation piece 38 has a larger outer diameter than the piston part 32. The compensation piece 38 is in particular also referred to as a pot. The compensation piece 38 has an annular region that adjoins the piston part 32. The lip 322 of the connection point 36 is arranged on the compensation piece 38.

The compensation piece 38 is formed integrally with the piston part 32, in particular as a single workpiece. The compensation piece 38 is produced together with the piston part 32 by deep-drawing from a single blank.

The working piston 30 has an inlet valve 40 that is arranged in a cavity in the piston part 32 and is configured to regulate a passage of the liquid out of the working cylinder 24 into the pressure cylinder 22. The cavity runs through the piston part 32 longitudinally.

The inlet valve 40 has a valve spring 42 with a conical shape. The valve spring 42 is anchored to the piston part 32 and is configured to press a sealing body 44 of the inlet valve 40 against a sealing seat 33 of the piston part 32. The sealing seat 33 is formed by a valve seat. The sealing seat 33 is formed integrally with the piston part 32. The sealing seat 33 is produced by deep-drawing. The sealing seat 33 is formed by a conical inwardly running end section of the piston part 32. However, it would also be conceivable for the sealing seat 33 to be formed by a separate component that is molded onto the piston part 32. The oscillating armature pump 20 has a coil unit 60 that is configured, at least in a state when current flows through it, to deflect the magnet element 34 out of an idle position and thus to set same in stroke motion. In addition to a coil, the coil unit 60 in particular has a coil core that surrounds the coil in order to focus an external magnetic field of the coil (not shown in detail).

The oscillating armature pump 20 has a spring unit 62 that is configured to generate forces in order to move the working piston 30 into the idle position. The spring unit 62 has a first spring 64 that is arranged in the first working chamber 242. The spring unit 62 has a second spring 66 that is arranged in the second working chamber 244. The first spring 64 is in the form of a compression spring and is configured to press the magnet element 34 in the direction of the second working chamber 244. The second spring 66 is in the form of a compression spring and is configured to press the magnet element 34 in the direction of the first working chamber 242. The springs 64, 66 are each in the form of spiral springs.

According to alternative embodiments, the spring unit has only one spring.

In a working cycle of the oscillating armature pump 20, the working piston 30 first executes a backward movement. During the backward movement, the working piston 30 is moved out of the pressure cylinder 22 so that a volume of the pressure chamber 26 is increased. An outlet of the pressure chamber 26 has an outlet valve 50 that only allows liquid to flow out of the pressure chamber 26. This results in a negative pressure in the pressure chamber 26, which causes the inlet valve 40 to be opened. The liquid then flows out of the working cylinder 24 via the cavity in the piston part 32 and via the inlet valve 40 into the pressure chamber 26.

During the backward movement, a portion of the liquid also flows out of the first working chamber 242 into the second working chamber 244 through the pass-through opening 35 in the magnet element 34 and through the compensation opening 39 in the compensation piece 38. This allows a pressure compensation between the first and second working chambers 242, 244.

The backward movement is for example driven actively by a force exerted by the coil unit 60 at least on the magnet element 34 in order to move the working piston out of its idle position. Alternatively, the force can be a restoring force of the spring unit 62, which drives the working piston back into the idle position.

After the backward movement, a forward movement is executed. During the forward movement, the working piston 30 is moved into the pressure cylinder 22 so that a volume of the pressure chamber 26 is decreased. This results in a positive pressure in the pressure chamber 26, which causes the inlet valve 40 to be closed. When a defined pressure is reached, the outlet valve 50 opens so that the liquid can escape from the pressure chamber 26 via the outlet valve 50.

The working cylinder 24 has an inlet 52 that provides liquid from a reservoir. The inlet 52 of the working cylinder 24 is arranged on an end of the working cylinder 24 opposite the pressure cylinder 22. During the forward movement, liquid continues to flow through the inlet 52 into the first working chamber 242. For pressure compensation, liquid also flows from the second working chamber 244 through the compensation opening 39 and the pass-through opening 35 into the first working chamber 242.

The forward movement is for example driven by a force that is a restoring force of the spring unit 62, which drives the working piston back into the idle position. Alternatively or additionally, it is possible for the force to be exerted by the coil unit 60 at least on the magnet element 34 in order to move the working piston out of its idle position. According to an alternative embodiment, it is conceivable for the coil unit to drive the magnet element alternately in different directions during oscillating stroke motion, in particular by reversing a current direction in the coil and in an embodiment of the magnet element with permanent magnetization.

FIGS. 5 to 6 show two further embodiments of the invention, in particular of the working piston. To distinguish the embodiments, the letters a or b are added to the reference signs of the further embodiments, wherein the same reference signs are used for the same or at least functionally related components. The rest of the description is limited substantially to the differences between the embodiments, wherein reference can be made to the description of the exemplary embodiment of FIGS. 1 to 4 for components, features and functions that remain the same. With respect to identically denoted components, in particular in relation to components with identical reference signs, reference can in principle also be made to the drawings and/or the description of the exemplary embodiment of FIGS. 1 to 4.

FIG. 5 shows an alternative working piston 30*a* having a magnet element 34*a* and a piston part 32*a*. The working piston 30*a* has a connection point 36*a*. The working piston 30*a* also has an compensation piece 38*a*. The compensation piece 38*a* is formed integrally with the magnet element 34*a*. The connection point 36*a* is formed between the compensation piece 38*a* and the piston part 32*a*. The piston part 32*a* has a lip 322*a*. The compensation piece 38*a* has a crimping collar 342. After the lip 322*a* is applied and the crimping collar 342 is deformed, the crimping collar 342 form-fittingly encloses the lip 322*a*.

FIG. 6 shows a further alternative working piston 30*b*. In contrast to an embodiment according to FIGS. 1 to 4, a magnet element 34*b* of the working piston 30*b* has a magnet collar 344*b*. The magnet collar 344*b* is cylindrical, alternatively conical, and extends parallel to an compensation piece 38*b*. The magnet collar 344*b* surrounds the compensation piece 38*b*. The magnet collar 344*b* is used to enlarge a magnetic mass of the working piston 30*b* in order to achieve greater forces during stroke motion of the working piston 30*b*. A second spring (66 in FIG. 2) of a spring unit for setting an idle position of the working piston 30*b* can be arranged between the magnet collar 344*b* and the compensation piece 38*b*.

According to further embodiments, it is conceivable for the compensation piece to be formed separately from the piston part and from the magnet element. In such an embodiment, the working piston can have two connection points, wherein the magnet element is connected to the compensation piece in a first of the connection points, and the compensation piece is connected to the piston part in a second of the connection points.

The invention claimed is:

1. An oscillating armature pump for conveying a liquid, having a pressure cylinder, a working cylinder, a working piston that has a piston part that is configured to be guided in the pressure cylinder and to delimit a pressure chamber together with the pressure cylinder, and that has a magnet element that is configured to be guided in the working cylinder, the working piston being configured to be set in stroke motion along a working axis in order to enlarge and/or reduce a volume of the pressure chamber, wherein the working piston has at least one first connection point that is configured to connect the piston part and the magnet element to one another, in particular directly, and to transmit forces having any direction from the magnet element to the piston part along the working axis, wherein the working piston has at least one inlet valve that is arranged in a cavity in the piston part and is configured to regulate a passage of the liquid out of the working cylinder into the pressure cylinder, and wherein the inlet valve has a valve spring having a conical or partially cylindrical shape.

2. The oscillating armature pump as claimed in claim 1, wherein the piston part is a deep-drawn part that is manufactured by means of a deep-drawing method.

3. The oscillating armature pump as claimed in claim 1, wherein the piston part is formed at least substantially cylindrical and has a diameter of less than 6 mm.

4. The oscillating armature pump as claimed in claim 1, wherein the piston part has an outer diameter that increases starting from the pressure chamber.

5. The oscillating armature pump as claimed in claim 1, wherein the piston part is formed at least substantially hollow-cylindrical and has a wall thickness of less than 0.5 mm.

6. The oscillating armature pump as claimed in claim 1, comprising at least one rod seal that is configured to seal the pressure chamber with respect to the piston part.

7. The oscillating armature pump as claimed in claim 1, wherein the working piston has at least one compensation piece that is arranged between the magnet element and the piston part and has an compensation opening that is configured to fluidically interconnect a first working chamber and a second working chamber, which are separated from one another by the magnet element, in the working cylinder, in such a way that the liquid flows through the magnet element when the working piston moves.

8. The oscillating armature pump as claimed in claim 7, wherein the compensation piece is formed integrally with the piston part.

9. The oscillating armature pump as claimed in claim 1, comprising at least one coil unit that is configured, at least in a state when current flows through a coil of the coil unit, to deflect the magnet element out of an idle position and thus to set same in the stroke motion.

10. The oscillating armature pump as claimed in claim 1, comprising a spring unit that is configured to generate forces that are configured to move the working piston into the idle position.

11. A coffee machine, having an oscillating armature pump as claimed in claim 1.

12. A piston part for an oscillating armature pump as claimed in claim 1.

13. A working piston for an oscillating armature pump as claimed in claim 1.

14. The oscillating armature pump as claimed in claim 1 wherein the oscillating armature pump is for a beverage machine.

15. An oscillating armature pump for conveying a liquid, having a pressure cylinder, a working cylinder, a working piston that has a piston part that is configured to be guided in the pressure cylinder and to delimit a pressure chamber together with the pressure cylinder, and that has a magnet element that is configured to be guided in the working cylinder, the working piston being configured to be set in stroke motion, in particular oscillating stroke motion, along a working axis in order to enlarge and/or reduce a volume of the pressure chamber, wherein the working piston has at least one first connection point that is configured to connect the piston part and the magnet element to one another and to transmit forces having any direction from the magnet element to the piston part along the working axis, wherein the working piston has at least one inlet valve that is arranged in a cavity in the piston part and is configured to regulate a passage of the liquid out of the working cylinder into the pressure cylinder, wherein the inlet valve has a valve spring having a conical or partially cylindrical shape, wherein the valve spring is designed as a compression spring that is configured to pull a sealing body into a sealing seat molded on the piston part.

16. The oscillating armature pump as claimed in claim 15 wherein the oscillating armature pump is for a beverage machine.

* * * * *